(12) United States Patent
Demaj et al.

(10) Patent No.: US 9,985,688 B2
(45) Date of Patent: May 29, 2018

(54) METHOD FOR PROCESSING A SIGNAL COMING FROM A TRANSMISSION CHANNEL

(71) Applicant: STMICROELECTRONICS (ROUSSET) SAS, Rousset (FR)

(72) Inventors: Pierre Demaj, Nice (FR); Yoann Bouvet, Opio (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days. days.

(21) Appl. No.: 15/042,326

(22) Filed: Feb. 12, 2016

(65) Prior Publication Data

US 2017/0012671 A1   Jan. 12, 2017

(30) Foreign Application Priority Data

Jul. 9, 2015  (FR) ..................................... 15 56487

(51) Int. Cl.
*H04B 3/54* (2006.01)
*H04B 3/466* (2015.01)
(Continued)

(52) U.S. Cl.
CPC ............ *H04B 3/544* (2013.01); *H04B 3/466* (2013.01); *H04B 3/542* (2013.01); *H04L 5/006* (2013.01);
(Continued)

(58) Field of Classification Search
CPC .. H03M 7/20; H04B 3/46; H04B 3/54; H04B 3/542; H04B 3/544; H04B 7/04; H04B 15/00; H04B 17/00; H04J 3/16; H04J 3/24; H04J 3/1694; H04J 11/00; H04J 11/0056; H04K 1/10; H04L 5/00; H04L 5/007; H04L 5/0023; H04L 5/0044; H04L 5/0073;
(Continued)

(56) References Cited

U.S. PATENT DOCUMENTS 6,314,131 B1    11/2001  Roe et al.
6,345,076 B1 *   2/2002  Petersen ........... H04L 25/03184
                                                          375/229

(Continued)

FOREIGN PATENT DOCUMENTS

| JP | 2007258897 A | 10/2007 |
| JP | 2009089146 | 4/2009 |
| WO | 2014037066 A1 | 3/2014 |

OTHER PUBLICATIONS

Bogdanovic et al., "Improved least square channel estimation algorithm for OFDM based communication over power lines", The Mediterranean Journal of Computers and Networks, Jul. 2014, pp. 232-238.

(Continued)

*Primary Examiner* — Shawkat M Ali
(74) *Attorney, Agent, or Firm* — Slater Matsil, LLP

(57) ABSTRACT

A method is for processing a channel analog signal coming from a transmission channel. The method may include converting the channel analog signal into a channel digital signal, and detecting a state of the transmission channel based on the channel digital signal to detect whether the transmission channel is, over an interval of time, one or more of linear and time invariant and linear and cyclostationary.

27 Claims, 10 Drawing Sheets

(51) Int. Cl.
  *H04L 5/00* (2006.01)
  *H04L 25/02* (2006.01)
  *H04L 27/26* (2006.01)

(52) U.S. Cl.
  CPC ........ *H04L 25/023* (2013.01); *H04L 27/2649* (2013.01); *H04B 2203/5495* (2013.01)

(58) Field of Classification Search
  CPC . H04L 7/00; H04L 12/26; H04L 25/02; H04L 25/0228; H04L 27/01; H04L 27/06; H04L 27/26; H04L 27/2601; H04L 27/2662
  USPC ....... 370/206, 208, 241, 252, 342, 347, 443; 375/227, 232, 257, 260, 340, 341
  See application file for complete search history.

(56) References Cited

U.S. PATENT DOCUMENTS

| | | | |
|---|---|---|---|
| 6,924,763 | B2 | 8/2005 | Poullin |
| 2003/0063596 | A1 | 4/2003 | Arslan et al. |
| 2008/0212652 | A1 | 9/2008 | Parker et al. |
| 2009/0003308 | A1 | 1/2009 | Baxley et al. |
| 2010/0039308 | A1* | 2/2010 | Bertagna ................ G01S 7/021 342/20 |
| 2010/0067629 | A1 | 3/2010 | Gaddam et al. |
| 2010/0124289 | A1 | 5/2010 | Yonge, III et al. |
| 2011/0075745 | A1 | 3/2011 | Kleider et al. |
| 2011/0081869 | A1* | 4/2011 | Breit ................... H04B 7/0413 455/67.11 |
| 2011/0267956 | A1* | 11/2011 | Yonge, III ............ H04L 12/413 370/241 |
| 2012/0143553 | A1 | 6/2012 | Feistel et al. |
| 2012/0195384 | A1 | 8/2012 | Sato |
| 2013/0051482 | A1 | 2/2013 | Nassar et al. |
| 2013/0170539 | A1 | 7/2013 | Huang et al. |
| 2014/0064348 | A1 | 3/2014 | Braz et al. |
| 2014/0355621 | A1 | 12/2014 | Katar et al. |
| 2015/0280888 | A1 | 10/2015 | Karsi et al. |
| 2016/0142175 | A1* | 5/2016 | Waheed ................ H04L 1/0003 370/329 |
| 2016/0285509 | A1 | 9/2016 | Wallis |

OTHER PUBLICATIONS

Tunc, "LPTV-Aware Bit Loading and Channel Estimation in Broadband PLC for Smart Grid", May 2014, pp. 1-97.

Donlan, "Ultra-wideband narrowband interference cancellation and channel modeling for communications", Jan. 2005, pp. 1-113.

Demaj et al, U.S. Appl. No. 15/053,264, filed Feb. 25, 2016, (cited application is stored in the USPTO's IFW system).

Demaj et al, U.S. Appl. No. 15/042,509, filed Feb. 12, 2016, (cited application is stored in the USPTO's IFW system).

Y. Bouvet, U.S. Appl. No. 15/04Z429, filed Feb. 12, 2016 (cited application is stored in the USPTO's IFW system).

\* cited by examiner

METHOD FOR PROCESSING A SIGNAL COMING FROM A TRANSMISSION CHANNEL

RELATED APPLICATION

This application is based upon prior filed copending French Application No. 1556487 filed Jul. 9, 2015, the entire subject matter of which is incorporated herein by reference in its entirety.

TECHNICAL FIELD

The present disclosure is directed to a method for transmission of information over a transmission channel and, in particular to, a transmission over a power line and related devices.

BACKGROUND

Power line communications (PLC) technology is aimed at transmitting digital data by utilizing the existing infrastructure of the electrical grid. It allows, in particular, remote reading of electric meters, exchanges between electric vehicles and the recharging terminals and also management and control of energy networks (smart grid). PLC technology incorporates, in particular, narrow band power line communication (N-PLC) which is generally defined as a communication over an electrical line operating at transmission frequencies of up to 500 KHz. N-PLC communication thus generally uses the frequency bands defined in particular by the European committee for electrotechnical standardization (CENELEC) or by the Federal Communications Commission (FCC). Thus, if the CENELEC A frequency band (3-95 kHz) is considered, the transmission frequencies are situated between 35.9375 and 90.625 KHz for the PLC-G3 standard.

The overall performance of a receiver greatly depends on the quality of its channel estimation, in other words of the estimation of the transfer function of this channel. It is known that a transmission channel can vary over time, in frequency, in phase, and in amplitude. Furthermore, the signals conveyed via PLC and received by the receiver result from a combination of several signals having taken several propagation paths within the transmission channel (i.e. the electrical power line), each having its own time delay and its own attenuation (the transmission channel is a multi-path transmission channel). This can then result in a significant attenuation of certain frequencies.

Furthermore, the properties and characteristics of electrical power grids are not a priori known and are variable over time. Thus, the impedances of certain objects connected by the user vary with the voltage. This is the case, for example, for halogen lamps or for objects comprising voltage rectifiers. When a user connects such objects, this then results in a variation of the transfer function of the transmission channel. The channel is then considered as linear and cyclostationary or linear and varying over time in a periodic manner, i.e. Linear Periodically Time Varying (LPTV). In other situations, the channel may be considered as linear and time invariant (LTI).

SUMMARY

Generally speaking, a method is for processing a channel analog signal from a transmission channel. The method may include converting the channel analog signal into a channel digital signal, and detecting a state of the transmission channel based on the channel digital signal to detect whether the transmission channel is, over an interval of time, at least one of LTI and linear and cyclostationary.

DETAILED DESCRIPTION

Figure 1:
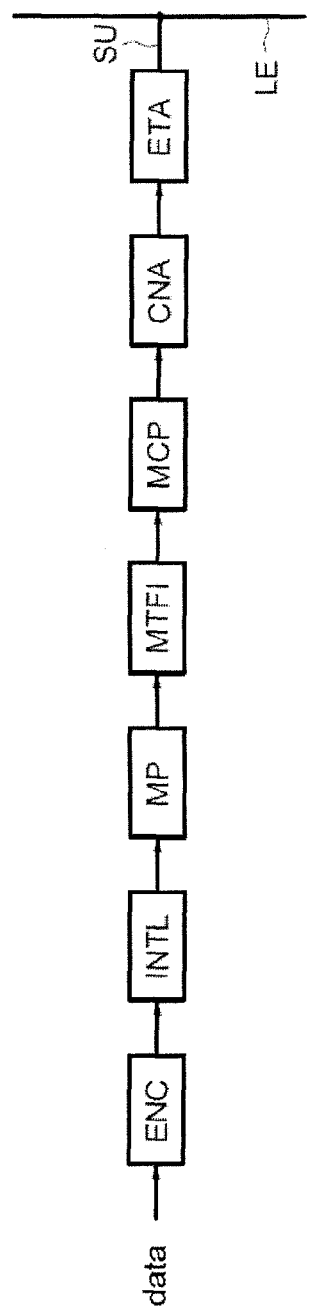
FIGS. 1-3 are schematic diagrams of a transmitter, according to the present disclosure.

The current receivers, compatible with the PLC-G3 standard, may not be adapted for carrying out channel estimations when the latter is variable over time. Indeed, the PLC-G3 standard may only include two orthogonal frequency-division multiplexing (OFDM) symbols as pilot symbols for totally estimating the transfer function of the channel. Also, when the channel varies, and notably when in the presence of a cyclostationary channel, the estimation of the channel is erroneous, or even impossible, and consequently leads to errors in decoding the symbols.

Various embodiments of the present disclosure and their implementation are compatible, notably but not exclusively, with the PLC-G3 standard such as defined, for example, in the version of April 2015 of the document from the G3-PLC Alliance entitled "Narrowband OFDM PLC specifications for G3-PLC networks" to which those skilled in the art will be able to refer at their convenience. Generally, the idea is to limit the risk of decoding errors due notably to erroneous channel estimation. Relatively simple channel estimation is provided, even in the case where the channel is considered as cyclostationary, and compatible with the PLC-G3 standard.

According to an aspect, a method is provided for processing a channel analog signal coming from a transmission channel, for example, an electrical power line, the signal then being conveyed via PLC. The method comprises at least one phase for detecting the state of the transmission channel based on a digital signal coming from an analog/digital conversion of the channel analog signal in such a manner as to detect whether the transmission channel is considered, over an interval of time, as being LTI or else as being LPTV.

The channel analog signal, which will undergo the analog/digital conversion, may, for example, be the analog signal coming directly from the channel or else, as is generally the case, the analog signal delivered by an analog input stage (notably comprising band pass filters, low-pass filters and an amplifier) connected to the transmission channel. The method may differ from the prior art by the fact that, prior to a channel estimation followed by a decoding of the symbols, the state of the transmission channel is detected, this being in real time from the received signal, which allows the risk of decoding errors due to an erroneous channel estimation to be limited.

This indeed allows a decision to be taken with regard to the subsequent processing operations to be applied, such as, for example, to temporarily suspend the decoding or else to use a channel estimation appropriate to the various states of the channel and thus to improve the overall performance of the receiver. The channel analog signal conforms, for example, to the PLC-G3 standard. When the channel analog signal conveys symbol frames, the detection phase can be carried out during the reception of at least one frame, the detected state of the channel being considered as valid for the whole duration of the at least one frame. In other words, the channel detected as being cyclostationary (periodically time varying) is considered as being cyclostationary for the whole duration of the at least one frame, and a channel detected as being time invariant is considered as being time invariant for the whole duration of the at least one frame.

However, it is preferable for the detection phase to be carried out during the reception of each frame since the state of the channel may potentially change from one frame to another. So, here again, it is considered that the state of the channel detected during the reception of a current frame is considered as valid for the whole duration of this current frame.

In an embodiment, the detection phase comprises a plurality of channel estimations respectively carried out using a plurality of reference symbols of the received frame in such a manner as to obtain a plurality of transfer functions for the channel, and a determination of at least one phase difference between at least one pair of transfer functions. The detection of the state comprises a comparison of the absolute value of the at least one phase difference with a threshold, the channel being considered as linear and time invariant if the absolute value of the at least one phase difference is less than or equal to the threshold and as linear and cyclostationary in the opposite case. On the transmission side, the channel analog signal comes from a digital/analog conversion of an initial digital signal, and when the sampling frequency of the digital signal (at reception) is different from the sampling frequency of the initial digital signal (at transmission), it is preferable to take into account this sampling frequency offset for correcting the transfer functions.

Thus, according to an embodiment, the plurality of channel estimations comprises estimations of base transfer functions respectively carried out using the plurality of reference symbols of the received frame, and a processing operation for correction of these base transfer functions with a phase shift corresponding to this shift in sampling frequency in such a manner as to obtain the transfer functions. In order to more easily detect the time variations of the channel, it is preferable to choose a set of reference symbols of the received frame which extend in time over a total duration equal to or slightly longer than the cyclostationary period, where it exists, of the channel, and to choose the two transfer functions of each pair, from which a phase difference is determined, in such a manner that they are respectively associated with two reference symbols separated in time by a period longer than a limiting period of time corresponding to a minimum number of reference symbols.

The total duration of the reference symbols is slightly longer than the cyclostationary period when the latter is not an integer multiple of the duration of a reference symbol. Thus, in this case, this period is, for example, included between two consecutive integer multiples of the duration of a reference symbol. Thus, by way of example, when the signal conforms to the PLC-G3 standard, each received frame comprises a preamble sequence followed by a header followed by a payload. The reference symbols then advantageously comprise the symbols of the header and two symbols of the payload corresponding to two known symbols of the transmitted frame.

The number of reference symbols is then equal to 15 and together extend over a duration equal to 10.42 ms (since each reference symbol has a duration equal to 0.695 ms). This total duration of 10.42 ms is slightly longer than the cyclostationary period, where relevant, of the channel (10 ms) which is equal to half of the period of the alternating current that will be flowing in the electrical power line (i.e. 20 ms for a frequency of 50 Hz). In the same way, in countries where the frequency of the mains is 60 Hz, the cyclostationary period of the channel is equal to 8.33 ms, and the number of reference symbols can be taken equal to 12.

The limiting number of reference symbols separating the two reference symbols of a pair is, for example, equal to 6, and the threshold allowing the time invariant or cyclostationary nature of the channel to be detected depends on the implementation chosen and may, for example, be equal to 0.75 radians. In such a manner as to further improve the detection of the state of the channel, the detection phase can comprise a determination of several phase differences respectively between several pairs of transfer functions, a processing operation for averaging the absolute values of these phase differences in such a manner as to obtain a mean phase difference, and a comparison of the mean phase difference with the threshold. The channel is considered linear and time invariant if the mean phase difference is less than or equal to the threshold and linear and cyclostationary in the opposite case.

The reference symbols of the received frame from which the various transfer functions will be determined, are, for example, symbols of the received frame corresponding to known symbols of the transmitted frame and/or are symbols that can be decoded without knowing the transfer function of the transmission channel. Thus, in the case of the PLC-G3 standard, as indicated hereinbefore, the reference symbols may be the thirteen symbols of the header of a frame, which can be decoded without knowing the transmission channel transfer function since they are coded in a differential manner, together with the two symbols of the payload of the frame, which correspond to the two known symbols S1, S2 of the payload of the transmitted frame.

It will accordingly be noted here that, although the PLC-G3 standard only provides as pilot symbols for the estimation of the transfer function of the channel two known symbols, namely the symbols S1 and S2, it is advantageously provided here for this number of pilot symbols to be increased by using the symbols of the header of a frame which may be decoded without needing to know the transfer function of the channel. Any potential time variations of the transmission channel can then readily be detected. However, it would also have been possible to also use as reference symbols all or part of the known symbols of the preamble sequence of a frame in order to improve the channel estimation or to increase the number of estimations if the duration of the header and of the symbols S1 and S2 is shorter than the duration of a half-period of the alternating signal conveyed by the channel (half-period of the mains supply).

Additionally, each channel estimation carried out using a received decodable symbol (e.g. a symbol of the header) comprises a decoding of the received symbol, a re-encoding of this decoded symbol in such a manner as to obtain a re-encoded symbol and a determination of the transfer function of the channel using the re-encoded symbol and the received decodable symbol. When the state of the transmission channel is detected, several possibilities are offered.

It is possible, in some applications, that the receiver having detected a transmission channel of the LPTV type is not adapted for correctly estimating the transfer function of such a channel. As a consequence, for performing the decoding of the symbols without too great a risk of error, the receiver decides to wait for the channel to, potentially, return to being of the LTI type in order to carry out the decoding of the symbols of the corresponding frame in the conventional manner according to the PLC-G3 standard, using only the symbols S1 and S2 of the frame to carry out the channel estimation then the decoding.

However, according to an embodiment, when the transmission channel is considered as linear and cyclostationary for the whole duration of the frame, it is possible to carry out an estimation of the transfer function of such a cyclostationary channel followed by a decoding. Accordingly, the generation may then be provided of a sequence of N transfer functions of the transmission channel, respectively associated with N successive time slices, the total duration of the N time slices being equal to almost the whole of the cyclostationary period of the channel (when this cyclostationary period is not an integer multiple of the duration of a time slice or of a symbol) or to the entirety of the period, then a decoding of at least some of the symbols of a frame by using for each of these symbols the transfer function associated with the time slice containing the symbol. A total duration of the N time slices equal to almost the whole of the cyclostationary period of the channel means or the channel, for example, that the cyclostationary period is in the range between N times and N+1 times the duration of a time slice.

In order to generate these N transfer functions, an initial sequence of M transfer functions respectively associated with M successive reference symbols of each frame may, for example, be generated, the M reference symbols covering a period of time equal to or slightly longer (when this cyclostationary period is not an integer multiple of the duration of a symbol) than the whole of the cyclostationary period, the N transfer functions being generated starting from these M transfer functions. The M transfer functions are advantageously those obtained during the phase for detecting the state of the transmission channel. Thus, in the case of the PLC-G3 standard, M is, for example, equal to 15 since fifteen reference symbols are used for generating the fifteen transfer functions.

Although it would be possible to use fourteen of these fifteen transfer functions for decoding the symbols of the payload of the frame, it turns out to be helpful, in order to obtain a better signal-to-noise ratio, to only use seven transfer functions (N=7), these N transfer functions being, for example, the averages taken two by two of fourteen successive transfer functions of the initial sequence of the M transfer functions. The decoding of the symbols following the last reference symbol then advantageously uses, successively and cyclically, the transfer functions of the sequence of the N transfer functions (e.g. N=7).

When the duration of the N time slices is different from the cyclostationary period, in other words when this cyclostationary period is not an integer multiple of the duration of a symbol, the decoding of symbols following the last reference symbol also comprises, periodically, a shift of transfer function in the successive and cyclical use of the transfer functions. Thus, for example, at a given moment in time and periodically, the same transfer function could be used twice in succession before returning to the normal cycle of the transfer functions.

When the signal is conveyed via PLC, the cyclostationary period of the channel is equal to half of the period of the alternating signal (current or voltage) designed to flow over the electrical power line. In such an application, a reference signal is delivered at each passage/crossing through "0" of the alternating signal (this is a signal known by those skilled in the art using the term "zero-crossing signal"). In this case, the value of the cyclostationary period of the channel can advantageously be reset based on the occurrences of the reference signal.

When the transmission channel is considered as LTI for the whole duration of a frame, it is particularly advantageous to perform a processing operation for averaging the plurality of transfer functions for the channel obtained during the detection phase (e.g. the fifteen transfer functions respectively obtained from the fifteen reference symbols (13 symbols of the header and the two symbols corresponding to the two known transmitted symbols S1 and S2)) in such a manner as to obtain a mean transfer function. Furthermore, in this case, the decoding of the symbols of the frame following the reference symbols is carried out using this mean transfer function. This allows the signal-to-noise ratio of the mean transfer function to be significantly increased, which will ultimately lead to an increase in the decoding performance by several dB.

According to another aspect, a receiver is comprises an input stage designed to be connected to a transmission channel and configured for delivering a channel analog signal coming from the transmission channel, a stage for analog/digital conversion of the channel analog signal so as to deliver a digital signal, and means for processing or a processor the digital signal. The processing means may comprise detection means or a detector configured for carrying out at least one phase for detecting the state of the transmission channel based on the digital signal in such a manner as to detect whether the transmission channel is considered, over an interval of time, as being linear and time invariant or else as being linear and cyclostationary.

Also, the channel analog signal conveys symbol frames, and the detection means are configured for performing the detection phase during the reception of at least one frame, the detected state of the channel being considered as valid for the whole duration of the at least one frame. However, the detection means can be configured for carrying out the detection phase during the reception of each frame, the state of the channel detected during the reception of a current frame being considered as valid for the whole duration of this current frame.

According to an embodiment, the detection means may comprise estimation means or an estimator configured for respectively carrying out a plurality of channel estimations using a plurality of reference symbols of the received frame in such a manner as to obtain a plurality of transfer functions of the channel, calculation means or a calculator configured for determining at least one phase difference between at least one pair of transfer functions, and comparison means or a comparator configured for performing a comparison of the absolute value of the at least one phase difference with a threshold. The channel is considered as LTI if the absolute value of the at least one phase difference is less than or equal to the threshold and as linear and cyclostationary in the opposite case.

According to an embodiment, the channel analog signal comes from a digital/analog conversion of an initial digital signal, and when the sampling frequency of the digital signal is different from the sampling frequency of the initial digital signal, the estimation means are configured for respectively carrying out estimations of base transfer functions based on the plurality of reference symbols of the received frame, and a processing operation for correction of these base transfer functions with a phase shift corresponding to this shift in sampling frequency so as to deliver the transfer functions. Moreover, the set of the reference symbols of the received frame extends in time over a total duration equal to or slightly longer than the cyclostationary period, where relevant, of the channel and the two transfer functions of each pair are respectively associated with two reference symbols separated in time by a period longer than a limiting period of time corresponding to a minimum number of reference symbols.

According to one embodiment, the calculation means is configured for respectively determining several phase differences between several pairs of transfer functions and for determining the average of the absolute values of these phase differences in such a manner as to obtain a mean phase difference. The comparison means is configured for carrying out a comparison of the mean phase difference with the threshold, the channel being considered as LTI if the mean phase difference is less than or equal to the threshold and as linear and cyclostationary in the opposite case. The reference symbols of the received frame are, for example, symbols of the received frame corresponding to known symbols of the transmitted frame and/or are symbols that can be decoded without knowing the transfer function of the transmission channel. The estimation means is then advantageously configured for carrying out a decoding of a received decodable symbol, a re-encoding of this decoded symbol in such a manner as to obtain a re-encoded symbol, and a determination of the transfer function associated with this received decodable symbol, using the re-encoded symbol and the received decodable symbol.

In some embodiments, the signal is modulated according to an OFDM modulation. The transmission channel may be an electrical power line, and the signal may be designed to be conveyed via PLC and the cyclostationary period, where relevant, of the channel is half of the period of the alternating current designed to flow over the electrical power line. According to an embodiment, the signal conforms to the PLC-G3 standard.

Each received frame may comprise a preamble sequence followed by a header followed by a payload, and the reference symbols comprise the symbols of the header and two symbols of the payload corresponding to two known symbols of the transmitted frame. The limiting number of reference symbols may be equal to 6. The threshold may be equal to 0.75 radians.

According to an embodiment, when the transmission channel is considered as linear and cyclostationary for the whole duration of the at least one frame, the processing means comprises generation means or a generator configured for generating a sequence of N transfer functions of the transmission channel respectively associated with N successive time slices. The total duration of the N time slices may be equal to almost the whole of the cyclostationary period of the channel and/or to the whole of the period. The processing means may include decoding means or a decoder configured for decoding at least some of the symbols of a frame using, for each of these symbols, the transfer function associated with the time slice containing the symbol.

The generation means may be configured for generating an initial sequence of M transfer functions respectively associated with M successive reference symbols of each frame, the M reference symbols covering a period of time equal to or slightly longer than the whole of the period, and for determining the N transfer functions from these M transfer functions. The M transfer functions may be those delivered by the estimation means incorporated within the detection means.

According to some embodiments, M is equal to 15, N is equal to 7, and the generation means is configured for calculating the averages taken two by two of fourteen successive transfer functions of the initial sequence in such a manner as to obtain the N transfer functions. The decoding means may be configured for using, successively and cyclically, the transfer functions of the sequence of the N transfer functions in order to decode the symbols following the last reference symbol.

Additionally, when the total duration of the N time slices is different from the period of cyclostationary, the decoding means may be configured for periodically applying a shift of transfer function in the successive and cyclical use of the transfer functions in order to decode the symbols following the last reference symbol also comprises. The signal may be designed to be conveyed via PLC, and the cyclostationary period of the channel may be half of the period of the alternating current designed to flow on the electrical power line. The input stage is configured for furthermore delivering a reference signal at each passage through zero of the alternating current, and the processing means are configured for resetting the value of the cyclostationary period of the channel based on the occurrences of the reference signal. When the transmission channel is considered as LTI for the whole duration of the at least one frame, the processing means may comprise an averaging module or an averaging circuit configured for carrying out a processing operation for averaging the plurality of transfer functions of the channel delivered by the detection means in such a manner as to obtain a mean transfer function, and decoding means configured for decoding symbols of the frame following the reference symbols using this mean transfer function.

The embodiments and their implementation will now be described in the framework of a transmission of information by PLC according to the PLC-G3 standard, although the present disclosure is not limited to this type of application. Throughout the following, each time that the PLC-G3 standard is cited, it will be assumed that the CENELEC A band of frequencies (3-95 kHz) is considered.

Reference is now made to FIG. 1 in order to illustrate schematically one example of transmitter capable of transmitting a useful signal SU over an electrical power line LE using PLC. The transmission chain, for example, comprises an encoder ENC, for example, a convolutional encoder, receiving the data to be transmitted from source coding means or a software enabled source. Interlacing means or an interlacer INTL are connected to the output of the encoder and are followed by mapping means or a mapper, which transforms the bits into symbols according to a transformation scheme depending on the type of modulation used, for example, a modulation of the binary phase-shift keying (BPSK) type or, more generally, a quadrature amplitude modulation (QAM) modulation.

Figure 2:
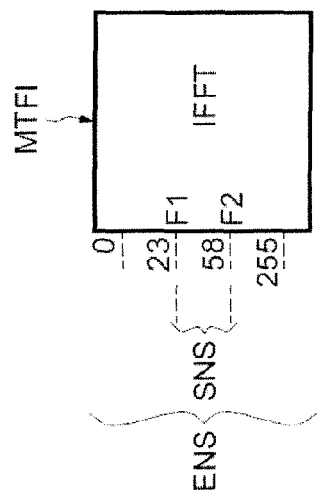

Each symbol contains modulation coefficients associated with carriers that will be modulated accordingly. The symbols are delivered at the input of processing means MTFI designed to perform an inverse fast Fourier transform (IFFT) operation. It will be noted here, referring more particularly to FIG. 2, that the modulated carriers form a subset SNS of carriers from amongst an available set ENS of carriers (set which corresponds to the size of the inverse Fourier transform).

Thus, in the PLC-G3 standard, the size of the inverse Fourier transform is equal to 256, whereas the modulated carriers of the subset SNS are included between the ranks 23 and 58, which corresponds to a frequency band F1-F2 in the range between 35.9375 and 90.625 KHz. Here, the sampling frequency is equal to 400 KHz resulting in a separation between the carriers equal to 1.5625 KHz, which thus renders the frequencies orthogonal (OFDM modulation). The modulation coefficients associated with the unused carriers are equal to 0.

The OFDM signal in the time domain is generated at the output of the processing means MTFI, and means MCP adds a cyclical prefix to each OFDM symbol in the time domain, which is a header copy of the OFDM symbol of a certain number of samples situated at the end of this symbol. By way of example, in the PLC-G3 standard, the length of the cyclical prefix is 30 samples for a sampling frequency of 400 KHz.

Figure 3:
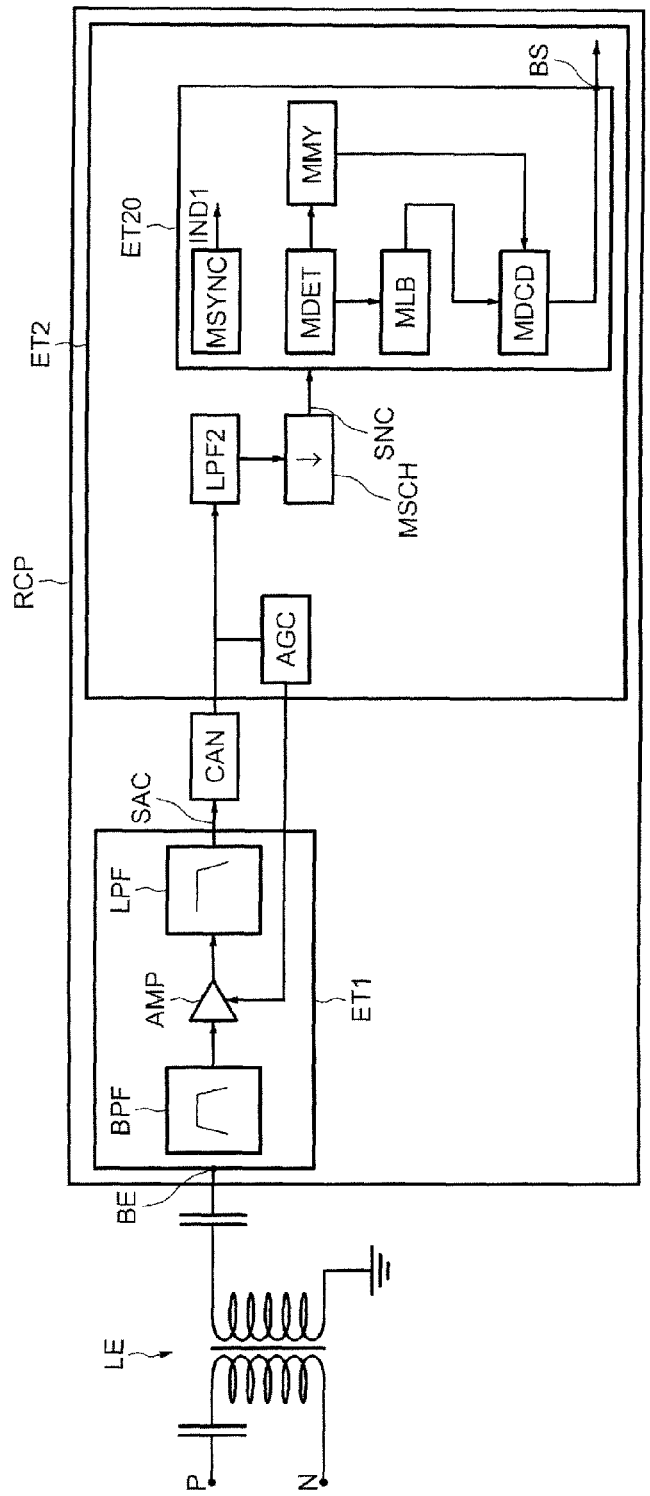

The signal is subsequently converted in a digital/analog converter CNA then processed in a stage ETA, commonly denoted by those skilled in the art under the term "Analog Front End", where it notably undergoes a power amplification, prior to being transmitted over the electrical power line LE. In reception, it can be seen, referring more particularly to FIG. 3, that the receiver RCP here comprises an input analog stage ET1 whose input terminal BE is connected to the electrical power line LE.

This analog input stage ET1 conventionally comprises a band pass filter BPF, a low-pass filter LPF, together with amplification means or an amplifier AMP. The output of the stage ET1 is connected to an analog/digital conversion stage CAN whose output is connected to the input of a processing means or stage ET2. The processing stage ET2 here comprises automatic gain control means or an automatic gain control circuit AGC allowing the value of the gain of the amplification means AMP of the stage ET1 to be controlled.

The signal SAC delivered at the output of the analog stage ET1 and at the input of the analog/digital conversion stage CAN represents a channel analog signal coming from the transmission channel (electrical power line) LE. The processing stage ET2 also comprises a low-pass filter LPF2 followed, although this is not indispensible, by under-sampling means or an under-sampling circuit MSCH. The sampling frequency of the signal upstream of the means MSCH is denoted Fs, whereas the sampling frequency of the signal at the output of the means MSCH is denoted Fss.

The signal SNC at the output of the means MSCH then here denotes a channel digital signal which comes from the analog/digital conversion of the channel analog signal SAC and to which notably a synchronization processing, channel estimations and decoding of symbols will be applied, as will be seen in more detail hereinafter. The channel estimations are carried out once the synchronization has been acquired.

The frequency Fc denotes the processing frequency at which the various processing operations will be carried out. In the PLC-G3 standard, for example, the sampling frequency Fs specified is 400 KHz for a size of FFT of 256. Although it would have been possible to perform all of these various processing operations at a processing frequency Fc equal to the sampling frequency Fs of 400 KHz, under-sampling the signal at a frequency Fss lower than Fs and performing all the operations at the processing frequency Fc equal to Fss allows the complexity of implementation of the processing stage to be reduced and also allows a processing operation for direct fast Fourier transform (FFT) to be carried out which has a reduced size with respect to the specified size of 256.

Figure 4:
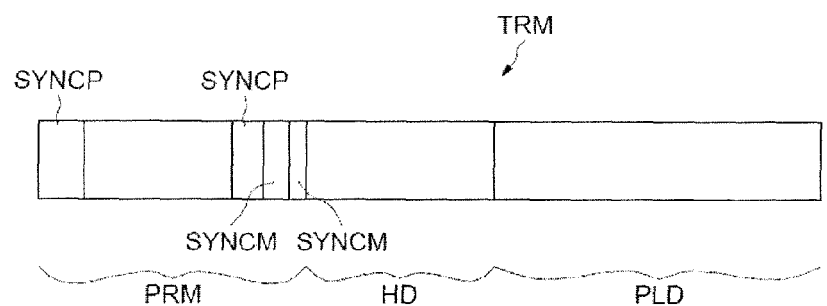
FIGS. 4-5 are schematic diagrams of a frame structure, according to the present disclosure.

Before returning in more detail to the various means/circuitry that are incorporated within the processing stage ET2, reference is now more particularly made to FIG. 4 in order to illustrate the structure of a frame conveying symbols, for example, in the framework of the PLC-G3 standard. The received frame TRM comprises a preamble sequence PRM here comprising eight known symbols SYNCP followed by a symbol of opposite phase SYNCM itself followed by a half-symbol SYNCM. The frame TRM subsequently comprises a header HD followed by a payload PLD containing symbols of useful data to be decoded. The symbols of the header HD notably contain control information for the decoding of the data of the field PLD, together with the number of bytes to be decoded within the field PLD.

The preamble sequence PRM of the frame TRM allows the receiver to synchronize itself, in other words to obtain an indication IND1 allowing the structure of the frame to be recovered in order to be able to identify the start of the header HD. If reference is now again made to FIG. 3, it can be seen that the processing stage ET2 comprises a sub-stage ET20 incorporating various means/circuitry which will now be described in a functional manner. These various means may be implemented by software within a microprocessor, for example, then forming, at least in part, the sub-stage ET20.

Amongst these various means/circuitry are conventionally found synchronization means or a synchronizer MSYNC allowing the receiver to synchronize itself, in other words to obtain the indication IND1 allowing the structure of the frame to be recovered in order to be able to identify the start of the header HD. These synchronization means may have a conventional structure known to the skilled person or else, as a variant, those incorporating the filtering means or a filter described in the French Patent application No. 1552588. Amongst the other means/circuitry incorporated into the sub-stage 20 are found detection means MDET configured for carrying out a detection of the state of the transmission channel using the digital signal SNC in such a manner as to detect whether the transmission channel is considered as being LTI or else as being linear and cyclostationary.

When the transmission channel is considered as linear and cyclostationary for the whole duration of a frame, for example, the processing means also comprise generation means MLB configured for generating, as will be seen in more detail hereinafter, a sequence of several transfer functions for the transmission channel respectively associated with N successive time slices. Decoding means MDCD, with a conventional structure known to the skilled person, are then configured for decoding at least some of the symbols of a frame, notably the symbols of the payload PLD of the frame, by using for each of these symbols the transfer function associated with the time slice containing the symbol. Here again, this decoding will be considered in more detail hereinafter.

On the other hand, when the transmission channel is considered as LTI for the whole duration of a frame, the processing means advantageously comprise an averaging module MMY configured for carrying out a processing operation for averaging the plurality of transfer functions for the channel delivered by the detection means MDET in such a manner as to obtain a mean transfer function. The decoding means then decode the symbols of the payload PLD of the frame advantageously using this mean transfer function. Here again, this functionality will be considered in more detail hereinafter.

Figure 5:
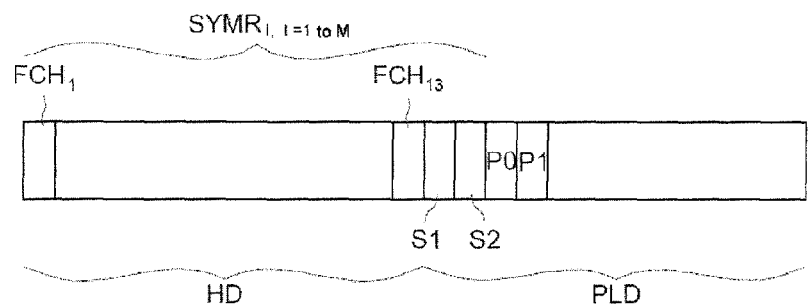

If the reference is now more particularly made to FIG. 5, it can be seen that the header HD of the received frame TRM comprises thirteen symbols $FCH_1$-$FCH_{13}$ which have been coded upon transmission in a differential manner and which are each referenced with respect to the preceding symbol. The frame TRM furthermore comprises, at the start of the payload PLD, two symbols corresponding to two known transmitted symbols S1, S2. However, for the sake of simplification, these two received symbols will also be denoted by S1 and S2.

The thirteen symbols $FCH_i$ and the two symbols S1 and S2 here form M reference symbols $SYMR_i$ (M is equal to 15 in this example). These reference symbols will be used for detecting the state of the transmission channel. The transmission channel is a linear channel, in other words it behaves as a linear filter. However, the channel may be considered as LTI or cyclostationary (i.e. LPTV). The LTI or cyclostationary (LPTV) state of the channel can vary from one frame to another, but this state is considered as unchanged during one frame.

When the transmission channel becomes cyclostationary during the reception of one or more frames, owing, for example, to the connection of a halogen lamp or of an object comprising voltage rectifiers, onto the electrical power line, the channel is periodic in amplitude and in phase in a synchronized manner with the alternating current or voltage present on the electrical power line. In other words, for a cyclostationary channel, the characteristics of its transfer function vary in the course of the cyclostationary period of the channel but are subsequently repeated periodically.

Figure 6:
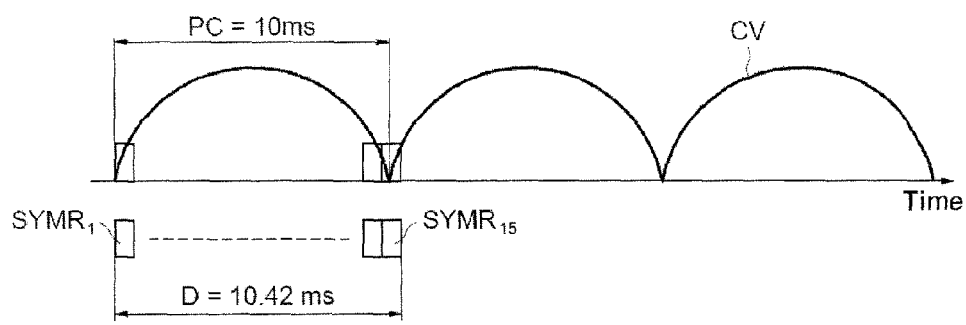
FIG. 6 is a diagram of periodic variations of the channel, according to the present disclosure.

FIG. 6 shows schematically, by the curve CV, the periodic variations of the channel and, in this figure, the reference PC denotes the cyclostationary period of the channel which is equal to half of the period of the alternating current or voltage present on the power line. Thus, for an alternating current and voltage at 50 Hz, the cyclostationary period PC of the channel is equal to 10 ms. Furthermore, in the PLC-G3 standard, each reference symbol $SYMR_i$ has a duration equal to 0.695 ms.

For this reason, the set of the 15 reference symbols $SYMR_1$-$SYMR_{15}$ extend in time over a total duration equal to 10.42 ms, which is therefore here slightly longer than the cyclostationary period PC. In other words, in the present case, the cyclostationary period PC is not an integer multiple of the duration of a reference symbol. The phase for detecting the state of the channel will now be described in more detail referring more particularly to FIGS. 7 to 10. This detection phase is carried out once the synchronization of the receiver has been acquired. This detection phase is carried out here upon receiving each frame and the processing operations carried out during one of these frames will now be described.

Figure 7:
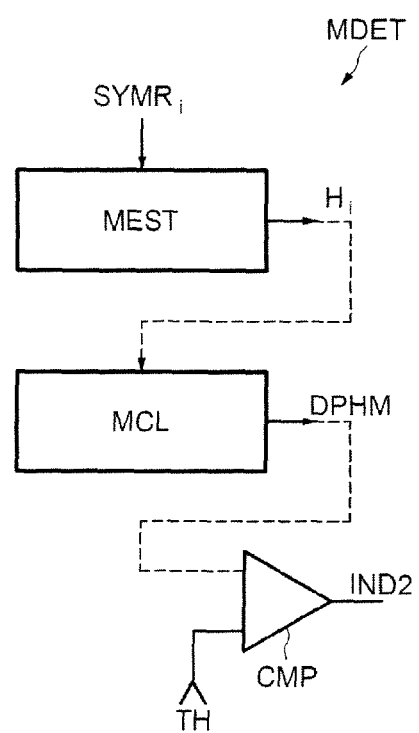
FIGS. 7-10 are flowcharts of a phase for detecting a state of the channel, according to the present disclosure.

As illustrated in FIG. 7, the detection phase carried out by the detection means MDET comprises a plurality of channel estimations respectively carried out by the estimation means MEST using the reference symbols $SYMR_i$ in such a manner as to obtain a plurality of transfer functions for the channel $H_i$. Processing means MCL will then calculate, starting from these transfer functions $H_i$, a mean phase difference DPHM that will be compared in comparison means CMP with a threshold TH. The result of this comparison provides an indication IND2 representative of the state LTI or LPTV of the channel.

More precisely, if the mean phase difference DPHM is less than the threshold TH, then the channel is considered as being of the LTI type during the frame in question, whereas if the mean phase difference DPHM is greater than threshold TH, the channel is considered as cyclostationary (LPTV) during this frame. In the case of a receiver according to PLC-G3, the threshold TH could, for example, be of the order of 0.75 radians.

Figure 8:
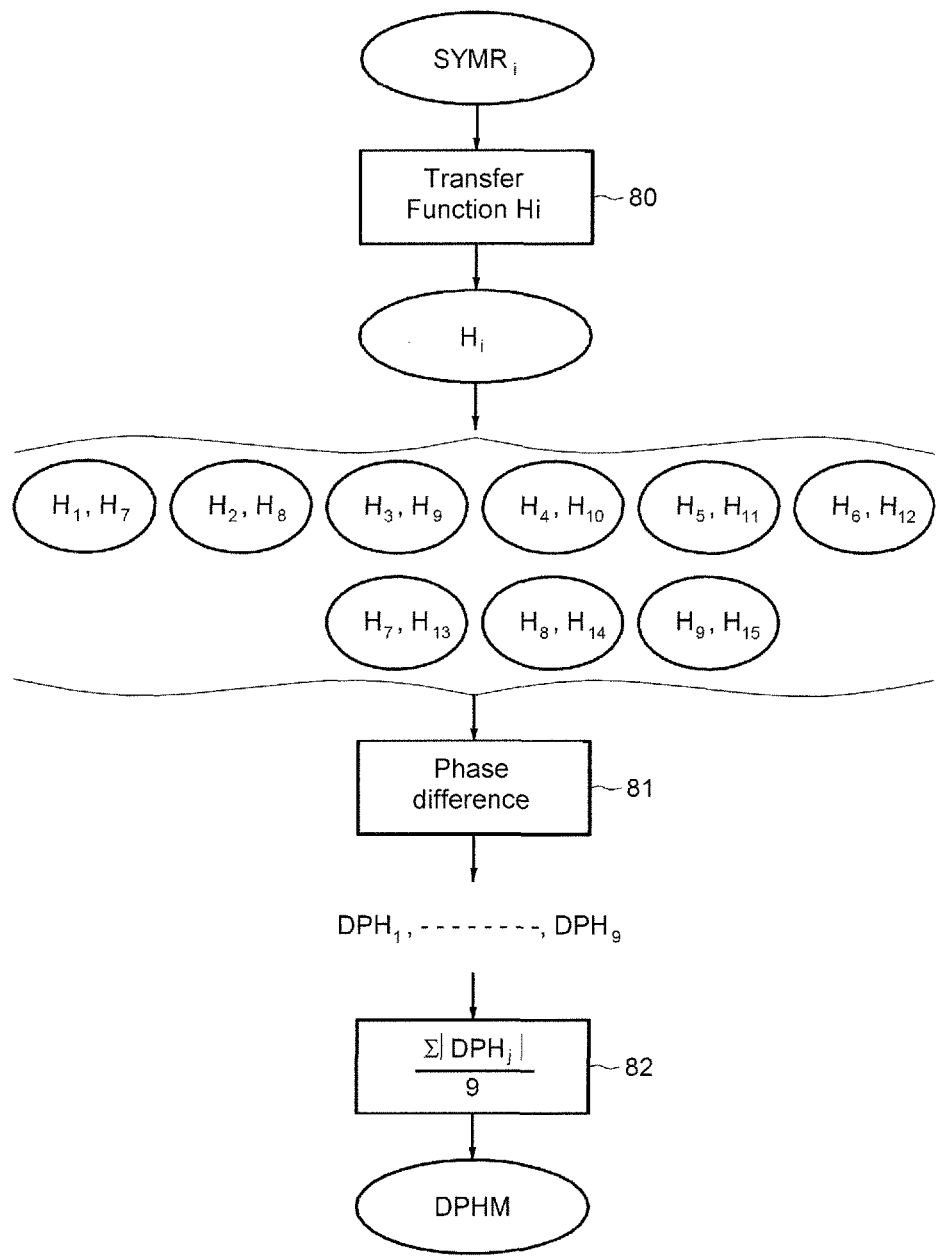
Figure 9:
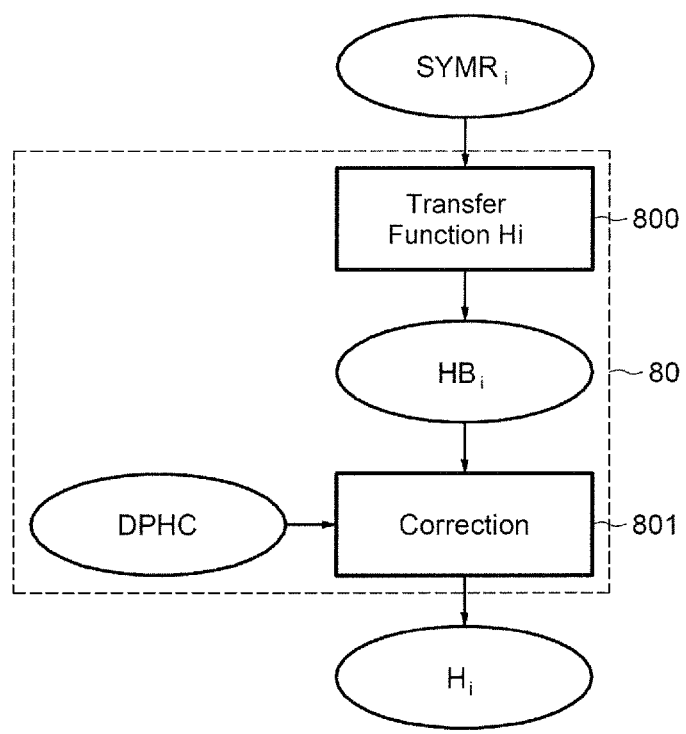

Reference is now more particularly made to FIG. 8 in order to illustrate one preferred embodiment allowing the mean phase difference DPHM to be obtained which is intended to be compared with the threshold TH. In the step 80, the transfer function $H_i$ for the channel is estimated from the reference symbol $SYMR_i$.

More precisely, this transfer function $H_i$ is equal to the product of the reference symbol received $SYMR_i$ with the complex conjugate of the corresponding symbol transmitted by the transmitter over the transmission channel. In the present case, conforming to the PLC-G3 standard, this transfer function $H_i$ is in fact a complex vector having 36 complex components respectively corresponding to the 36 tones of the symbol. At the end of the step 80, 15 transfer functions $H_1$-$H_{15}$ are therefore obtained respectively corresponding to the 15 reference symbols $SYMR_1$-$SYMR_{15}$.

It would then be possible to only determine at this stage a single phase difference between two of these transfer functions. However, it is helpful to determine such a phase difference between two transfer functions spaced out over time by a minimum number of reference symbols, for example, 6 reference symbols, so as to better determine this phase difference.

However, it is even more advantageous to determine several phase differences based on several different pairs of transfer functions and to calculate the average so as to obtain the mean phase difference DPHM. This will now be described in more detail. The step 81 determines the phase difference between two transfer functions $H_i$ and $H_k$ by simply taking the product of $H_i$ with the complex conjugate of $H_k$.

Since a minimum number of symbols equal to 6 has been chosen, 9 doublets can be formed: $H_1$, $H_7$; $H_2$, $H_8$; $H_3$, $H_9$; $H_4$, $H_{10}$; $H_5$, $H_{11}$; $H_6$, $H_{12}$; $H_7$, $H_{13}$; $H_8$, $H_{14}$ and $H_9$, $H_{15}$. Of course, it would be perfectly possible not to use these nine doublets in order to obtain nine phase differences. It is nevertheless assumed, in this embodiment, that the nine doublets are used in such a manner as to obtain nine phase differences $DPH_1$-$DPH_9$.

In the step 82, the average of the absolute values of these phase differences is calculated in such a manner as to obtain the mean phase difference DPHM. In the embodiment that has just been described, it has been assumed that the sampling frequency for the transmission was identical to the sampling frequency of the channel digital signal SNC. However, as indicated hereinbefore, the sampling frequency of the digital signal SNC may be different from the initial digital signal generated in the transmitter.

In this case, a shift in the sampling frequency results, known by those skilled in the art as "sampling frequency offset", that needs to taken into account in the estimation of the transfer functions $H_i$. This is illustrated schematically in FIG. 9. More precisely, in the step 800, in a manner analogous to what has been described in the step 80 of FIG. 8, base transfer functions $HB_i$ are determined that are respectively associated with the reference symbol $SYMR_i$.

Then, the sampling frequency offset is estimated using, for example, two base transfer functions that are relatively widely spaced out in time, for example, the transfer functions $HB_1$, and $HB_{13}$. The phase shift resulting from this is then obtained by taking the product of the transfer function $HB_1$ with the complex conjugate of the transfer function $HB_{13}$, dividing it all by the number of symbols. A phase shift correction DPHC is then obtained, which is applied in a step

801 for correcting the transfer functions $HB_i$, and obtaining the transfer functions $H_i$. The estimation of a transfer function based on each of the symbols S1 and S2 can be carried out without difficulty since the transmitted symbols corresponding to the received symbols S1 and S2 are known.

Figure 10:
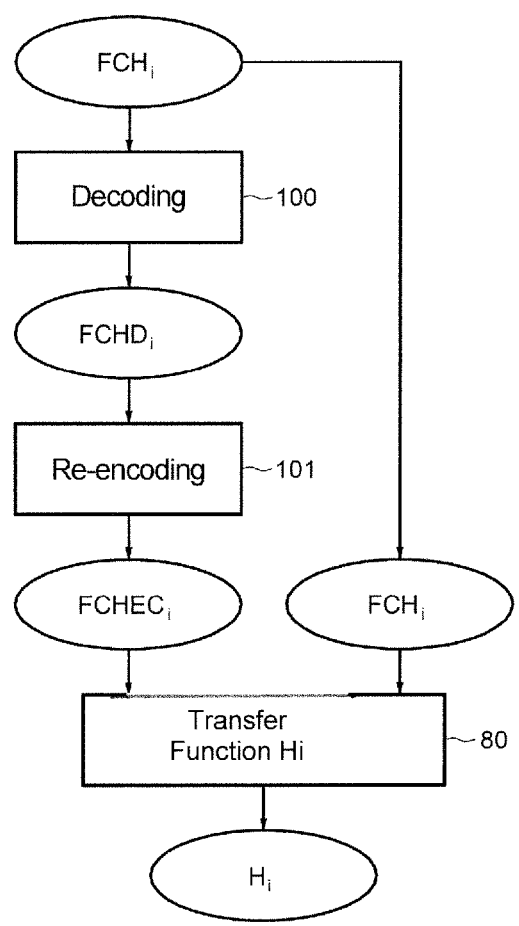

On the other hand, this is not the case for the reference symbols of the header, in other words the symbols $FCH_i$. Nevertheless, as indicated hereinbefore, these symbols $FCH_i$ have been coded at transmission in a differential and particularly robust manner. Their decoding does not therefore require the knowing the transfer function of the channel. The FIG. 10 illustrates one example of estimation of a transfer function $H_i$ of the channel using the symbol $FCH_i$ of the received header. The decoding (step 100) of the received symbol $FCH_i$ is first of all carried out. For this purpose, the decoding means conventionally comprise means/circuitry configured for extracting the cyclical prefix from each symbol, followed by means/circuitry configured for carrying out the Direct fast Fourier transform FFT.

The decoding means also comprise "de-mapping" means supplying, for each carrier, a value of the corresponding modulation coefficient (bin). These de-mapping means are followed by a module configured for determining, for each modulation coefficient, a confidence indicator (or "soft decision") for the value. This module is conventional and known per se and uses, for example, an algorithm of the LogMAP type.

The decoding means also comprise de-interlacing means or a de-interlacer followed by a decoder, for example, a decoder of the Viterbi type, followed by means/circuitry designed to carry out a parity check. The output of these means/circuitry is connected to the output terminal BS of the sub-stage ET20 which is connected to the means/circuitry forming the MAC layer of the receiver. Since the various symbols $FCH_i$ are referenced with respect to the preceding symbols in the frame, it is necessary to decode all the symbols $FCH_i$ of the header with the aforementioned decoding means. Then, after verifying that the parity check is correct, the various decoded symbols $FCHD_i$ can be obtained. Then, in the step 101, a re-encoding of each of these symbols $FCHD_i$ is carried out using a convolutional encoder, an interlacer and a mapping means analogous to the corresponding means/circuitry ENC, INTL, MP illustrated in FIG. 1 for the transmitter part.

It will be noted, with regard to the above, that the operations remain in the frequency domain. Re-encoded symbols $FCHEC_i$ corresponding to the transmitted symbols are then obtained. In the step 80, analogous to the step 80 in FIG. 8, the transfer functions $H_i$ associated with the various symbols $FCH_i$ can then be obtained using these received symbols $FCH_i$ and the re-encoded symbols $FCHEC_i$. At this stage, the state of the channel has been detected.

Reference is now more particularly made to FIGS. 11 to 14 in order to illustrate the continuation of the processing operations in the case where the channel has been detected as being, for the frame in question, cyclostationary. As a first stage, the transfer functions of the transmission channel will be estimated which are respectively associated with various successive time slices, the total duration of these time slices being equal to almost the whole of the cyclostationary period PC of the channel (when the cyclostationary period is not an integer multiple of the duration of a symbol but is in the range between two consecutive integer multiples of the duration of the symbol) or to the entirety of this period (when the cyclostationary period is an integer multiple of the duration of a symbol).

Figure 11:
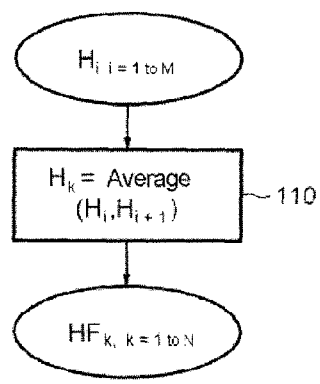
FIGS. 11-15 are flowcharts of operations of the devices, according to the present disclosure.
Figure 12:
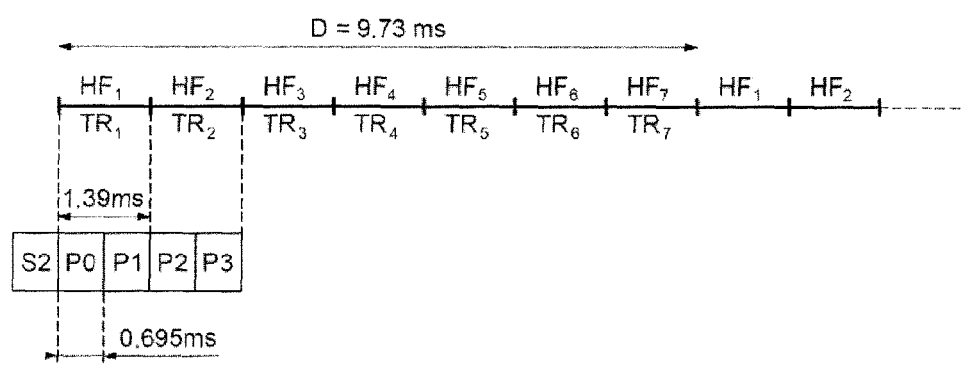
Figure 13:
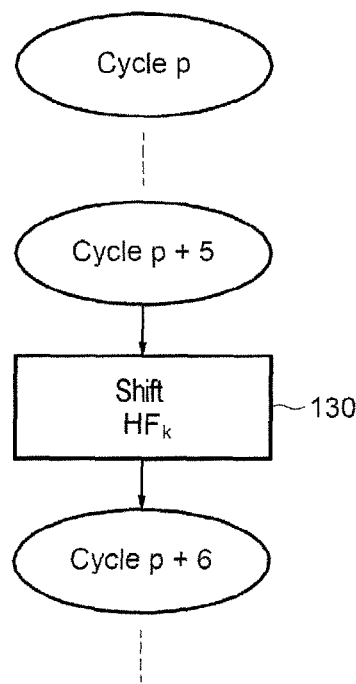
Figure 14:
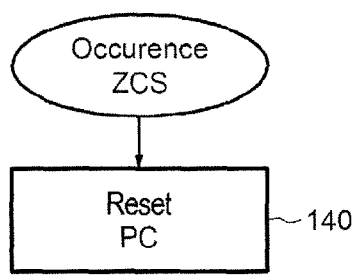

For this purpose, the M transfer functions $H_i$ determined during the phase for detecting the state of the channel (FIG. 11) will advantageously be re-used. Although it would be possible to directly use fourteen of these transfer functions $H_i$ for the later decoding of the symbols P0, P1, . . . of the payload PLD of the frame, it is preferable, so as to improve the signal-to-noise ratio, to reduce this number of transfer functions. Thus, as illustrated in FIG. 11, starting from the M transfer functions $H_i$ (M=15), by performing an averaging taking certain of the transfer functions $H_i$ two by two (step 110), N (e.g. N=7) transfer functions $HF_k$, k varying from 1 to N, respectively associated with seven time slices $TR_1$-$TR_7$ (FIG. 12). The duration of each time slice is equal to the duration of two symbols P of the payload PLD, i.e. 1.39 ms.

Accordingly, the total duration D of all the time slices $TR_1$-$TR_7$ is equal to 9.73 ms, which is slightly less than the cyclostationary period PC (10 ms). In the step 110, in order to obtain the seven transfer functions $HF_k$, fourteen transfer functions $H_i$ are chosen from amongst the fifteen transfer functions obtained during the detection phase. The transfer functions $H_2$-$H_{15}$ will, for example, be chosen and, in this case, the transfer function $HF_1$ is equal to the average of the transfer functions $H_2$ and $H_3$. The transfer function $HF_2$ is equal to the average of the transfer functions $H_3$ and $H_4$, and so on, until the transfer function $HF_7$ is obtained which is equal to the average of the transfer functions $H_{14}$ and $H_{15}$.

As illustrated in FIG. 12, the transfer function $HF_k$, which is associated with the time slice $TR_k$ containing the symbol to be decoded, will be used for decoder the symbols P0, P1, P2 . . . which follow the last reference symbol S2. The transfer function used is taken into account, as is known by those skilled in the art, in the de-mapping means incorporated into the decoding means. Then, the transfer functions of the sequence of the N transfer functions $HF_1$-$HF_7$ will be used successively and cyclically.

In other words, once the complete cycle of the seven transfer functions $HF_1$-$HF_7$ have been used, the cycle is repeated starting with the use of the transfer function $HF_1$ up to $HF_7$ and so on. However, when the duration D of the N time slices is different from the cyclostationary period, there will be a progressive time shift between the cycle of the transfer functions $HF_1$-$HF_7$ and the cyclostationary period of the channel. In other words, at a given moment in time, there will be a time difference equal to a time slice between the cycle of the transfer functions and the variation cycle of the channel. In this successive and cyclical use of the transfer functions, a transfer function shift should then be applied. This is illustrated schematically in FIG. 13.

In the present illustrative example, with a duration D equal to 9.73 ms and a cyclostationary period of 10 ms, this shift is applied after five transfer function cycles and for the execution of the sixth cycle, the transfer function HF7 will be used a second time instead of directly using the transfer function $HF_1$. Of course, after having used the transfer function $HF_7$ a second time, the cycle of the transfer functions $HF_1$-$HF_7$ is continued.

It may also happen that the value of the cyclostationary period, which is directly linked to the period of the alternating signal flowing in the electrical power line, is time shifted owing to a time shift of the period of the alternating electrical signal on the line. This may be corrected by way of a reference signal ZCS (FIG. 14) which is delivered each time that the alternating current or voltage passes through "0". Accordingly, in this case, the value of the cyclostationary period of the channel can be reset (step 140) based on the occurrences of the reference signal ZCS.

Figure 15:
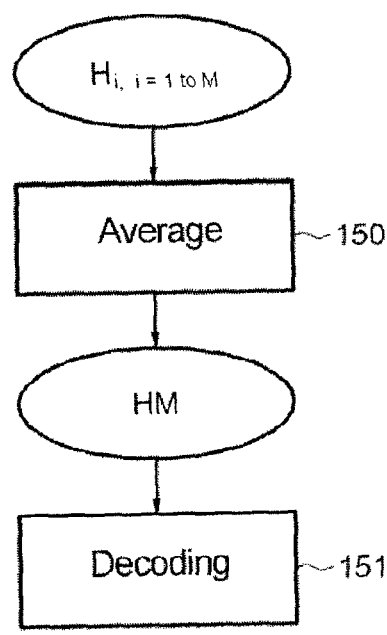

Reference is now more particularly made to FIG. 15 in order to illustrate an advantageous embodiment which may be used when the transmission channel has been detected as being time invariant (channel LTI). More precisely, instead of simply using the symbols S1 and S2 of a frame for estimating the transfer function of the channel, the M (M=15) transfer functions $H_i$ associated with the 15 reference symbols and having been determined during the detection phase may advantageously be used for calculating their average (step 150) in such a manner as to obtain a mean transfer function which will then be used for the decoding (step 151) of the symbols of the payload PLD of the frame. This allows the signal-to-noise ratio of the transfer function HM to be significantly increased, which will ultimately lead to an improvement of several dB in the decoding performance characteristics.

Other features relating to communications are disclosed in U.S. patent application Ser. No. 15/042,429, now U.S. Pat. No. 9,838,080, filed on Feb. 12, 2016, and incorporated herein by reference in its entirety.

That which is claimed is:

1. A method for processing a channel analog signal coming from a transmission channel, the method comprising:
   detecting, during a detection phase, a state of the transmission channel based on a channel digital signal from an analog to digital conversion of the channel analog signal to determine whether the transmission channel is, over an interval of time, linear and time invariant (LTI) or linear and cyclostationary; and
   generating a first signal based on determining whether the transmission channel is, over the interval of time, LTI or linear and cyclostationary, wherein the channel analog signal includes a plurality of frames, each frame comprising a plurality of symbols; and wherein the detection phase is carried out during reception of a frame, the detected state of the transmission channel being valid for a duration of the frame, and wherein the detection phase comprises:
      performing a plurality of channel estimations respectively using a plurality of reference symbols of the frame to generate a plurality of transfer functions of the transmission channel, and
      determining a phase difference between a pair of transfer functions, the detecting of the state comprising a comparison of an absolute value of the phase difference with a threshold, the transmission channel being LTI when the absolute value of the phase difference is less than or equal to the threshold and being linear and cyclostationary when the absolute value of the phase difference is greater than the threshold.

2. The method according to claim 1, wherein the detection phase is carried out during reception of each frame, the detected state of the transmission channel detected during reception of a current frame being valid for a duration of the current frame.

3. The method according to claim 1, wherein the channel analog signal is from a digital to analog conversion of an initial digital signal, and wherein when a sampling frequency of the channel digital signal is different from a sampling frequency of the initial digital signal, performing the plurality of channel estimations comprises:
   estimating a plurality of base transfer functions respectively based upon the plurality of reference symbols of the frame, and
   correcting the plurality of base transfer functions with a phase shift corresponding to a shift in sampling frequency between the channel digital signal and the initial digital signal.

4. The method according to claim 1, wherein the plurality of reference symbols of the frame extends in time over a duration equal to or greater than a cyclostationary period; and wherein each pair of transfer functions is respectively associated with a pair of reference symbols separated in time by a period longer than a limiting period of time corresponding to a minimum number of reference symbols.

5. The method according to claim 4, wherein a limiting number of reference symbols is 6.

6. The method according to claim 1, wherein the detection phase comprises:
   determining a plurality of phase differences respectively between a plurality of pairs of transfer functions;
   averaging absolute values of the plurality of phase differences to generate a mean phase difference; and
   comparing the mean phase difference with the threshold, the transmission channel being LTI when the mean phase difference is less than or equal to the threshold and being linear and cyclostationary when the mean phase difference is greater than the threshold.

7. The method according to claim 1, wherein the plurality of reference symbols of the frame corresponds to a plurality of known symbols of the frame, the plurality of reference symbols being decoded without knowing a transfer function of the transmission channel.

8. The method according to claim 7, wherein each channel estimation is based upon a received decodable symbol and comprises:
   decoding of the received decodable symbol;
   re-encoding of the received decodable symbol to generate a re-encoded symbol; and
   determining the transfer function of the transmission channel based upon the re-encoded symbol and the received decodable symbol.

9. The method according to claim 7, wherein each frame comprises a preamble sequence, a header following the preamble sequence, and a payload following the header; and wherein the plurality of reference symbols is in the header and the payload.

10. The method according to claim 9, further comprising:
    when the transmission channel is linear and cyclostationary for a duration of the frame,
    generating a sequence of N transfer functions of the transmission channel respectively associated with N successive time slices, a duration of the N successive time slices being equal to a cyclostationary period of the transmission channel, and
    decoding at least some symbols of a frame using, for each of the at least some symbols, a transfer function associated with a successive time slice including a respective symbol.

11. The method according to claim 10, wherein generating the sequence of N transfer functions comprises generating an initial sequence of M transfer functions respectively associated with M successive reference symbols of each frame, the M successive reference symbols covering a period of time equal to or greater than the cyclostationary period, the N transfer functions being based upon the M transfer functions.

12. The method according to claim 11, wherein the initial sequence of M transfer functions is generated during the detection phase.

13. The method according to claim 11, wherein M is equal 15; wherein N is equal to 7; and wherein the sequence of N transfer functions is averages taken two by two of fourteen successive transfer functions of the initial sequence of M transfer functions.

14. The method according to claim 11, wherein decoding of symbols following a last reference symbol uses, successively and cyclically, the sequence of N transfer functions.

15. The method according to claim 14, wherein when the duration of the N successive time slices is different from the cyclostationary period, the decoding of the symbols following the last reference symbol also periodically comprises a shift of transfer function in the successive and cyclical use of the sequence of N transfer functions.

16. The method according to claim 14, wherein the channel analog signal is conveyed via power-line communication, the cyclostationary period of the transmission channel being half of a period of an alternating current flowing on an electrical power line; wherein a reference signal is delivered at each zero crossing of the alternating current; and wherein a value of the cyclostationary period of the transmission channel is reset based upon an occurrence of the reference signal.

17. The method according to claim 1, wherein the channel analog signal is modulated based upon an orthogonal frequency-division multiplexing (OFDM) modulation.

18. The method according to claim 1, wherein the transmission channel comprises an electrical power line, the channel analog signal being conveyed via power-line communication; and wherein a cyclostationary period of the transmission channel is half of a period of an alternating current flowing on the electrical power line.

19. The method according to claim 18, wherein the channel analog signal is based upon a power-line communication (PLC) PLC-G3 standard.

20. The method according to claim 1, wherein the threshold is 0.75 radians.

21. The method according to claim 1, further comprising, when the transmission channel is LTI for a duration of the frame, averaging a plurality of transfer functions of the transmission channel during the detection phase to generate a mean transfer function, and decoding symbols of the frame following reference symbols using the mean transfer function.

22. A method for processing a channel analog signal from a transmission channel, the method comprising:
converting the channel analog signal into a channel digital signal; and
detecting a state of the transmission channel based on the channel digital signal to determine whether the transmission channel is, over an interval of time, linear and time invariant (LTI) or linear and cyclostationary; and
generating a first signal based on determining whether the transmission channel is, over the interval of time, LTI or linear and cyclostationary, wherein the channel analog signal includes a plurality of frames, each frame comprising a plurality of symbols; and wherein the detecting of the state is carried out during reception of a frame, the detected state of the transmission channel being valid for a duration of the frame, and wherein the detecting of the state comprises:
performing a plurality of channel estimations respectively using a plurality of reference symbols of the frame to generate a plurality of transfer functions of the transmission channel,
determining a phase difference between a pair of transfer functions, and
comparing an absolute value of the phase difference with a threshold, the transmission channel being LTI when the absolute value of the phase difference is less than or equal to the threshold and being linear and cyclostationary when the absolute value of the phase difference is greater than the threshold.

23. The method according to claim 22, wherein the detecting of the state is carried out during reception of each frame, the detected state of the transmission channel detected during reception of a current frame being valid for a duration of the current frame.

24. The method according to claim 22, wherein the channel analog signal is from a digital to analog conversion of an initial digital signal; and wherein when a sampling frequency of the channel digital signal is different from a sampling frequency of the initial digital signal, the plurality of channel estimations comprises:
estimating a plurality of base transfer functions respectively based upon the plurality of reference symbols of the frame, and
correcting the plurality of base transfer functions with a phase shift corresponding to a shift in sampling frequency between the channel digital signal and the initial digital signal.

25. The method according to claim 22, wherein the plurality of reference symbols of the frame extends in time over a duration equal to or greater than a cyclostationary period; and wherein each pair of transfer functions is respectively associated with a pair of reference symbols separated in time by a period longer than a limiting period of time corresponding to a minimum number of reference symbols.

26. A method for processing a power-line communication (PLC) analog signal from an electrical power line transmission channel, the method comprising:
converting the PLC analog signal into a channel digital signal; and
detecting a state of the electrical power line transmission channel based on the channel digital signal to determine whether the electrical power line transmission channel is, over an interval of time, linear and time invariant (LTI) or linear and cyclostationary; and
generating a first signal based on detecting whether the electrical power line transmission channel is, over the interval of time, LTI or linear and cyclostationary, wherein the PLC analog signal includes a plurality of frames, each frame comprising a plurality of symbols; and wherein the detecting of the state is carried out during reception of a frame, the detected state of the electrical power line transmission channel being valid for a duration of the frame, and wherein the detecting of the state comprises:
performing a plurality of channel estimations respectively using a plurality of reference symbols of the frame to generate a plurality of transfer functions of the electrical power line transmission channel,
determining a phase difference between a pair of transfer functions, and
comparing an absolute value of the phase difference with a threshold, the electrical power line transmission channel being LTI when the absolute value of the phase difference is less than or equal to the threshold and being linear and cyclostationary when the absolute value of the phase difference is greater than the threshold.

27. The method according to claim 26, wherein the detecting of the state is carried out during reception of each frame, the detected state of the electrical power line transmission channel detected during reception of a current frame being valid for a duration of the current frame.

* * * * *